INVENTOR.
ALBERT L. RENKEY
BY. *William C. ...*
ATTORNEY

United States Patent Office 3,438,620
Patented Apr. 15, 1969

3,438,620
REVEBERATORY COPPER-MATTE
SMELTING FURNACE
Albert L. Renkey, Bethel Park, Pa., assignor to Dresser
Industries, Inc., Dallas, Tex., a corporation of Delaware
Filed Apr. 21, 1967, Ser. No. 632,689
Int. Cl. F27d 1/02; C04b 29/02
U.S. Cl. 266—43                                        4 Claims

ABSTRACT OF THE DISCLOSURE

A reverberatory copper-matte smelting furnace construction in which at least the charging holes are constructed of phosphate-bonded brick having from 60 to 90% $Al_2O_3$.

BACKGROUND

Figure 1:
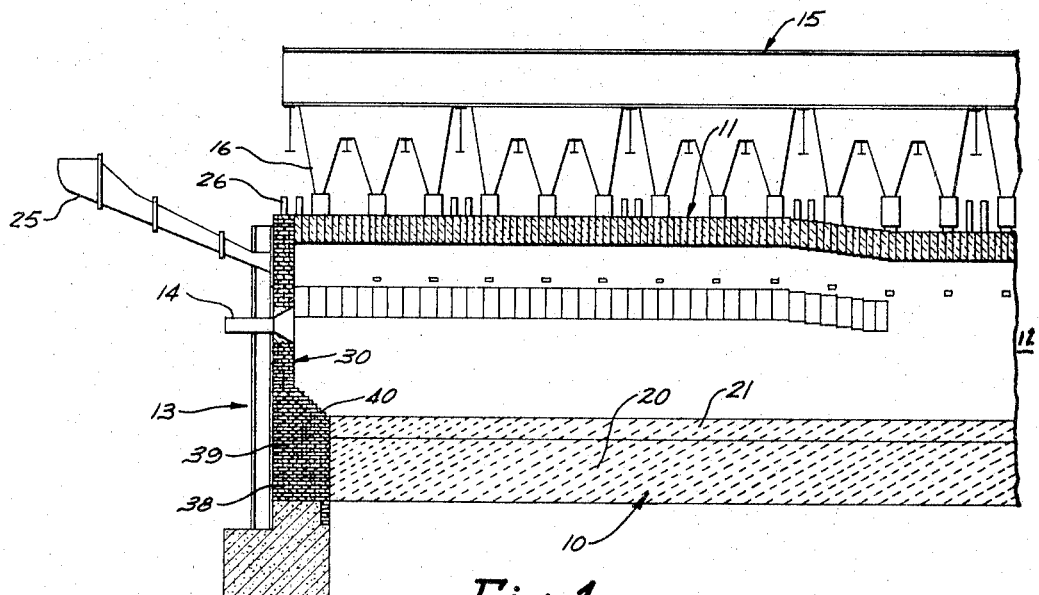

Reverberatory furnaces used for smelting copper ores run about 115 ft. in length, more or less, and vary in width from 25 to 30 ft. In general, the charge consists of roasted or unroasted concentrates in wet or dry form and, at intervals, molten slag from the converter plus suitable fluxing materials. The fuel may be natural gas, oil, or powdered coal, depending upon availability and cost. Temperatures range from 2,700 to 3,000° F. in the smelting zone and at least 2,000 to 2,300° F. at the skimming end. The product of the furnace is copper matte, which consists mainly of cuprous sulfide with appreciable proportions of ferrous sulfide and small proportions of other sulfides.

THE PRIOR ART

At one time, silica brick were used almost to the exclusion of all other refractories for the entire construction of copper reverberatory furnaces. Higher production rates have imposed increasingly severe conditions on the refractories, and now silica brick are frequently inadequate—particularly in more vulnerable positions of the furnace; for example, the charging holes and the end and side walls adjacent the hot end of the furnace. Inadequacy of silica brick has led to increased use of basic brick and, in at least one instance of which I am aware, high-purity, burned, high alumina brick.

Sprung-arch roofs still are built of silica brick, preferably of the super duty type. Sometimes such a roof will have shoulders of chemically-bonded magnesite chrome brick laid up with steel plates. Also, suspended-arch construction has been used for roofs built entirely of chemically-bonded basic brick of the internally metal reinforced, metal-encased type.

Particularly when wet concentrates are charged to the furnace, due to spalling and hydration problems which can arise when using basic brick, high-magnesia burned brick having superior hydration resistance has led to improved results. The walls and bottom of the furnace have been advantageously built of chemically-bonded, metal-encased brick and burned brick (particularly below the slag line) usually backed up with silica or high-duty fireclay brick. The bottom usually consists of several feet of converter slag or magnesite tamped into place with a working hearth of sintered magnesite, crushed silica rock, or high-silica slag.

OBJECTS OF THE INVENTION

It is a primary object of the invention to provide an improved roof for the reverberatory copper-matte smelting furnace. It is a further object of the invention to provide an improved reverberatory copper-matter smelting furnace construction about charging holes; and also about end walls and side walls particularly at the hot end of the furnace.

BRIEF DESCRIPTION OF THE INVENTION

The objects of the invention are accomplished in one aspect by constructing charge holes of phosphate-bonded, high alumina brick. In a preferred aspect, the brick include from 60 to 90% $Al_2O_3$, on an oxide basis, and from 3 to 15% phosphoric acid, also based on the weight of the brick. According to the best mode now known for the practice of the invention, the brick have the following typical oxide analysis:

| | Percent |
|---|---|
| $Al_2O_3$ | About 88 |
| $SiO_2$ | About 8 |
| $TiO_2$, $Fe_2O_3$ | Remainder |

The $TiO_2$ amounts to a little less than 3%; for example, it will run about 2.9%. The $Fe_2O_3$ runs a little over 1%; for example, on the order of 1.3%. The $P_2O_5$ content of the preferred brick is about 5%. This amount of $P_2O_5$ can be introduced into the brick mix by using from 7 to 10% of 85% phosphoric acid, based on total brick weight. I would suggest about 8% as being the optimum and best mode now known.

THE DRAWINGS

Figure 2:
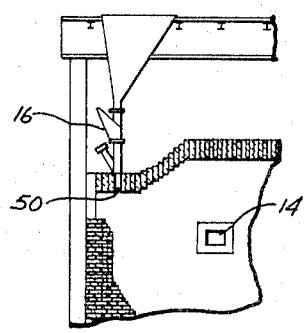

FIG. 1 is a side sectional elevation of the hot end of a typical reverberatory copper-matte smelting furnace according to the invention; and FIG. 2 is a fragmentary view of a portion of the burner wall of the furnace of FIG. 1, and is intended to better illustrate the opening 50 through which charge material passes from the hopper 16.

Before describing the drawings in detail, it should be understood that they are intended as exemplary and not limiting. Further, when I herein use the verbiage "high alumina," I intend it to carry the ASTM definition, i.e., including at least about 50% $Al_2O_3$ on an oxide basis. High alumina brick are made from various alumina-containing materials which are blended to obtain the desired $Al_2O_3$ content. An exemplary description of this will be found, for example, in U.S. Patent No. 3,067,050, which description is herein incorporated by reference.

Brick for the practice of the present invention are made according to conventional techniques as far as size gradation, pressing, tempering, and so forth are concerned. An exemplary typical brickmaking grind is as follows:

| Mesh | Percent |
|---|---|
| −3 +10 | 20 |
| −10 +28 | 30 |
| −28 +65 | 10 |
| −65 | 40 |

Further, from 40 to 60% of the −65 mesh material will also pass a 325 mesh screen. Such a size-graded mixture is combined in conventional equipment with the aqueous $P_2O_5$ tempering material to obtain a good combination of the ingredients, after which the ingredients are formed into brick on a press at conventional pressures; for example, at a pressure of about 8,000 p.s.i.

The FIG. 1 furnace is shown to include a hearth area 10, roof 11, skimmer end 12, and a back wall 13 through which a plurality of burners 14 open. Atop the roof is a feed arrangement 15 which includes a plurality of downwardly-converging feed hoppers 16 which open through the roof 11 to the furnace below. The hearth I show in the drawings is conventional and consists of a magnesite or slag fill 20 upon which is a sintered magnesite or crushed silica hearth 21. Through the burner end wall 13 there additionally opens the converter slag launder 25. A plurality of structural members 26 run across the arch of the roof from which the brick forming the roof are suspended. These members have been omitted from FIG. 2 to maintain drawing simplicity.

The burner wall 13, according to a preferred aspect of the invention, is comprised of at least an inner or working lining of phosphate-bonded, high-alumina brick of the type hereinbefore discussed. Below the slag line, which would be roughly at the point 30 in FIG. 1, the phosphate-bonded brick are not necessary, although they can be used. I have shown a conventional combination of fireclay brick 38 supporting a silica brick backup area 39 and a working face 40 of burned magnesite brick. Any type of conventional fireclay, super duty silica, and burned magnesite brick can be used as dictated by conventional practice.

In one actual field trial according to the concepts of this invention outstanding success has been observed. Historically, copper metallurgists have had trouble with the charging holes through the top of a reverberatory furnace. Even such extremely strong high alumina brick such as disclosed and claimed in 3,067,050 (90% $Al_2O_3$ content) and contemporary direct-bonded basic brick (for example, of the type discussed in U.S. Patent 3,180,744), while better than silica or metal-encased chemically-bonded basic brick, have not been the complete answer. Prior to the present invention, in the test furnace I mentioned immediately above, the best prior arrangements of which I am aware for constructing charge holes would last only about 3 months. After 4 months of operation, charging holes constructed according to the present invention still looked good.

According to the broadest aspect of the invention, phosphate-bonded high alumina brick are extended to the other critical areas of the furnace, including the end and side walls in the smelting area as well as the entire roof in this area. Broadly, the present invention consists of fabricating those parts of the working lining of a reverberatory copper-matte smelting furnace which are exposed to the smelting operation at temperatures over 2,300° F. and usually over 2,700° F. of phosphate-bonded high alumina brick. The remainder of the furnace can be constructed of conventional refractory shapes known to the prior art and including silica brick of both regular and super duty classes, fireclay brick of sufficient refractoriness including (but not limited to) medium, high, and super duty fireclay brick, high alumina brick of both burned and chemically-bonded types, and basic brick of either burned and/or chemically-bonded type, including but not limited to magnesite, chrome ore-magnesite, magnesite-chrome ore, and forsterite.

Having thus described the invention in detail and with sufficient particularity as to enable those skilled in the art to practice it, what is desired to have protected by Letters Patent is set forth in the following claims:

I claim:

1. In reverberatory copper-matte smelting furnaces of the type including a hearth, a roof, walls extending between the roof and the hearth to form a metallurgical treatment chamber, burners to heat material in said chamber, and including a plurality of charging hoppers above the roof having lower openings through said roof, the improvement comprising at least the openings extending through said roof being fabricated entirely of phosphate-bonded high alumina brick.

2. The furnace of claim 1 in which the roof and end and side walls defining said metallurgical treatment chamber are fabricated entirely of phosphate-bonded high alumina brick.

3. The furnace of claim 1 in which said high alumina brick includes from 60 to 90% $Al_2O_3$, on an oxide basis and based on the total brick weight, and between 7 and 10% of $P_2O_5$.

4. The furnace of claim 1 in which said phosphate-bonded high alumina brick are used to form those portions of said metallurgical chamber which are exposed to temperatures of over 2,300° F. in service.

References Cited

UNITED STATES PATENTS

| | | | |
|---|---|---|---|
| 2,966,421 | 12/1960 | Zimmerman et al. | 106—65 X |
| 3,115,336 | 12/1963 | Longenecker | 266—33 X |
| 3,179,526 | 4/1965 | Dolph | 266—43 X |
| 3,244,511 | 4/1966 | Nicaise | 266—33 X |

J. SPENCER OVERHOLSER, *Primary Examiner.*

EUGENE MAR, *Assistant Examiner.*

U.S. Cl. X.R.

106—65; 266—33